(12) United States Patent
Katz et al.

(10) Patent No.: US 8,245,164 B2
(45) Date of Patent: Aug. 14, 2012

(54) METHOD OF VERIFICATION OF ADDRESS TRANSLATION MECHANISMS

(75) Inventors: Yoav Avraham Katz, Haifa (IL); Anatoly Koyfman, Haifa (IL); Elena Tsanko, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 12/550,419

(22) Filed: Aug. 31, 2009

(65) Prior Publication Data

US 2009/0319961 A1 Dec. 24, 2009

Related U.S. Application Data

(62) Division of application No. 11/679,192, filed on Feb. 27, 2007, now abandoned.

(51) Int. Cl.
*G06F 17/50* (2006.01)
(52) U.S. Cl. .......................... 716/106; 716/103; 716/132
(58) Field of Classification Search ........................ None
See application file for complete search history.

(56) References Cited

U.S. PATENT DOCUMENTS

| | | | | |
|---|---|---|---|---|
| 7,370,296 B2 * | 5/2008 | Koyfman et al. | ............. | 716/104 |
| 7,434,101 B2 * | 10/2008 | Adir et al. | ........................ | 714/33 |
| 2005/0278702 A1 | 12/2005 | Koyfman et al. | | |
| 2006/0212756 A1 | 9/2006 | Emek et al. | | |

OTHER PUBLICATIONS

Aharon et al., "Test Program Generation for Functional Verification of PowePC Processors in IBM," 32nd ACM/IEEE Design Automation Conference, 7 pages.*

Bentley, "Validating the Intel Pentium 4 Miccroprocessor," 2001 IEEE, pp. 493-498.*
Fournier et al., "Functional Verification Methodology for Microprocessors Using the Genesys Test-Program Generator," Functional Verification Methodology, Dec. 17, 1998, 8 pages.*
Geller et al., "Assumption-Based Pruning in Conditional CSP," P. van Beek (Ed.): CP 2005, LNCS 3709, pp. 241-255.*
Gutkovich et al., "CP with Architectural State Lookup for Functional Test Generation," 2006 IEEE Int'l High Level Design and Test Workshop, pp. 111-118.*
Kodakara et al., "Model Based Test Generation for Microprocessor Architecture Validation," 20th Int'l Conference on VLSI Design, Jan. 2007, 8 pages.*
Kumar, "Algorithms for Constraint-Satisfaction Problems: A Survey," AI Magazine, Spring 1992, pp. 32-44.*
Lichtenstein et al., "Model Based Test Generation for Processor Verification," IAAI-94 Proceedings, 1994, pp. 83-94.*
Mittal et al., "Dynamic Constraint Satisfaction Problems," AAAI-90 Proceedings, 1990, pp. 25-32.*
Taylor et al., "Functional Verification of a Multiple-issue, Out-of-Order, Superscalar Alpha Processor—The DEC Alpha 21264 Microprocessor," 1998 Design Automation COnference, pp. 638-644.*
Adir et al., "Genesys-Pro: Innovations in Test Program Generation for Functional Processor Verification," IEEE Design & Test of Computers, Mar.-Apr. 2004, pp. 84-93.*
Adir et al., "DeepTrans—Extending the Model-based Approach to functional Verification of Address Translation Mechanisms," 2006 IEEE Int'l High Level Design and Test Workshop, pp. 103-110.*
Avi Ziv, "Stimuli generation", 2006 (Source: http://webcourse.cs.technion.ac.il/236605/Spring2006/ho/WCFiles/Lecture5_4perPage.pdf, 21 pages.

(Continued)

*Primary Examiner* — Leigh Garbowski (57) ABSTRACT

Device, system and method of verification of address translation mechanisms. For example, an apparatus for testing an address translation mechanism of a design-under-test, the apparatus including: a test generator to receive a specification of at least one address translation table, and to generate one or more constraint-satisfaction-problem projectors over a plurality of attributes of said address translation table.

20 Claims, 5 Drawing Sheets

OTHER PUBLICATIONS

Bin et al, "Using a constraint satisfaction formulation and solution techniques for random test program generation", IBM Systems Journal, vol. 41, No. 3, 2002, pp. 386-402.

Roy Emek et al, "Quality Improvement Methods for System-level Stimuli Generation", 2004 (*Source*: http://tima.imag.fr/MPSOC/2004/slides/Emek.pdf), 16 pages.

Allon Adir et al., "DeepTrans—a model-based approach to functional verification of address translation mechanisms", Proceedings. 4th International Workshop on Microprocessor Test and Verification—Common Challenges and Solutions, 2003, 3-6, 4 pages.

Boris Gutkovich et al., "CP with Architectural State Lookup for Functional Test Generation", presented at HLDVT 2006, 7 pages.

\* cited by examiner

METHOD OF VERIFICATION OF ADDRESS TRANSLATION MECHANISMS

FIELD

Some embodiments of the invention are related to the field of verification of a hardware design including an address translation mechanism.

BACKGROUND

A computing device may utilize an address translation mechanism, for example, in order to map references to virtual address space into physical memory resources. A hardware-based address translation mechanism may include, for example, translation tables and control registers.

A design verification system may utilize simulation-based techniques to perform functional verification of a hardware design. Unfortunately, it may be difficult to perform functional verification of an address translation mechanism included in the hardware design. For example, manual verification of a hardware design of an address translation mechanism may be time consuming and error prone, and may have narrow coverage corresponding to the few cases that are manually tested.

SUMMARY

Some embodiments of the invention may include, for example, devices, systems and methods of verification of address translation mechanisms.

Some embodiments may provide, for example, an apparatus for testing an address translation mechanism of a design-under-test, the apparatus including a test generator to receive a specification of at least one address translation table, and to generate one or more constraint-satisfaction-problem projectors over a plurality of attributes of the address translation table.

In some embodiments, for example, the test generator is to generate a first constraint-satisfaction-problem projector to project over attributes of a first translation table specification, and to generate a second, different, constraint-satisfaction-problem projector to project over attributes of a second, different, translation table specification.

In some embodiments, for example, the specification includes: information indicating a format of a translation table entry; a projector implementing a match rule; a projector implementing a translation rule; and a projector between a location of the translation table entry and a content of the translation table entry.

In some embodiments, for example, the constraint-satisfaction-problem projector includes a constraint-satisfaction-problem projector over at least: a first variable representing an input address of the address translation table; a second variable representing an output address of the address translation table; a third variable representing availability of translation of the input address; and a fourth variable representing a size of translation region.

In some embodiments, for example, if a value of the third variable indicates availability of translation of the input address, the constraint-satisfaction-problem projector further includes a constraint-satisfaction-problem projector over at least: a fifth variable representing a location of a translation table entry usable for translation the input address; and a sixth variable representing a content of the translation table entry usable to translate the input address.

In some embodiments, for example, the test generator is to extract from the specification: a first variable representing an input address of the address translation table; a second variable representing an output address of the address translation table; a third variable representing availability of translation of the input address; a fourth variable representing a size of translation region; a fifth variable representing a location of a translation table entry usable for translation the input address; and a sixth variable representing a content of the translation table entry usable to translate the input address, wherein the test generator is to apply a pre-defined projector generation algorithm to generate the one or more constraint-satisfaction-problem projectors, wherein the test generator is to solve one or more constraint-satisfaction-problems to generate a test case for the design-under-test.

Some embodiments may provide, for example, a method for testing an address translation table of a design-under-test, the method including: setting a match parameter indicating whether a translation table entry is able to correctly translate an input address; synchronizing entry fields of the address translation table with entry data of the address translation table; if the synchronization succeeds, and the match parameter is not false, running a match relation function; if, after running the match relation function, the match parameter is not false, running a transformation relation function; and if substantially no domains of the address translation table are modified by the transformation relation function, determining whether a previously-initialized set of address table entries is consistent with a current match status.

In some embodiments, for example, the method may further include generating a constraint-satisfaction-problem over substantially all attributes of the address translation table.

In some embodiments, for example, the method may further include solving the constraint-satisfaction-problem to generate a test case for the design-under-test.

In some embodiments, for example, the method may further include determining which sets of translation table entries are usable for address translation; determining that one or more translation table entries are inconsistent with one or more constraints associated with the address translation table; and removing the one or more inconsistent translation table entries.

In some embodiments, for example, the method may further include removing one or more empty sets of translation table entries.

In some embodiments, for example, the method may further include removing substantially all values of variables that no sets of translation table entries exist that are able to translate them.

In some embodiments, for example, the method may further include, if substantially all addresses have a translation, setting the match parameter to be true.

In some embodiments, for example, the method may further include, if substantially all addresses do not have a translation, setting the match parameter to be false.

Some embodiments may include, for example, a computer program product including a computer-useable medium including a computer-readable program, wherein the computer-readable program when executed on a computer causes the computer to perform methods in accordance with some embodiments of the invention.

Some embodiments of the invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that embodiments of the invention may be practiced without these specific details. In other instances, well-known methods, procedures, components, units and/or circuits have not been described in detail so as not to obscure the discussion.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of items" may include two or more items.

Although portions of the discussion herein may relate, for demonstrative purposes, to wired links and/or wired communications, embodiments of the invention are not limited in this regard, and may include one or more wired links, may utilize one or more components of wireless communication, may utilize one or more methods or protocols of wireless communication, or the like. Some embodiments of the invention may utilize wired communication and/or wireless communication.

At an overview, in some embodiments, a design verification system may include an automatic stimuli generator that utilizes a constraint-satisfaction-problem (CSP) engine, which may utilize a CSP projector over the CSP variables representing the translation table attributes that restrict the attributes to "legal" values or "valid" values. In some embodiments, a design verification system may be adapted to automatically generate a CSP projector over translation table attributes, for example, over substantially all the translation table attributes that possibly participate in the address translation process, based on a specification of the address translation table or the address translation mechanism. For example, the design verification system may automatically generate a CSP projector between variables that represent input and output addresses of the translation tables, availability of translation of an input address, the location and contents of entry used to translate the input address (if translation is available), and the size of the translated region. In some embodiments, the design verification system engine may generate the CSP projector based on input which may include, for example: a set of CSP variables representing substantially all the translation table attributes; the format of a translation entry; a projector implementing a match rule; a projector implementing a translation rule; a projector between the location of an entry and a content of the entry.

In some embodiments, the design verification system may receive a first specification corresponding to a first design-under-test having a first address translation table, and the test generator may be able to automatically generate a first CSP projector over attributes (e.g., over substantially all the attributes) of the first address translation table. Then, the design verification system may receive a second, different, specification corresponding to a second, different, design-under-test having a second, different, address translation table, and the test generator may be able to automatically generate a second, different, CSP projector over attributes (e.g., over substantially all the attributes) of the second address translation table.

Figure 1:
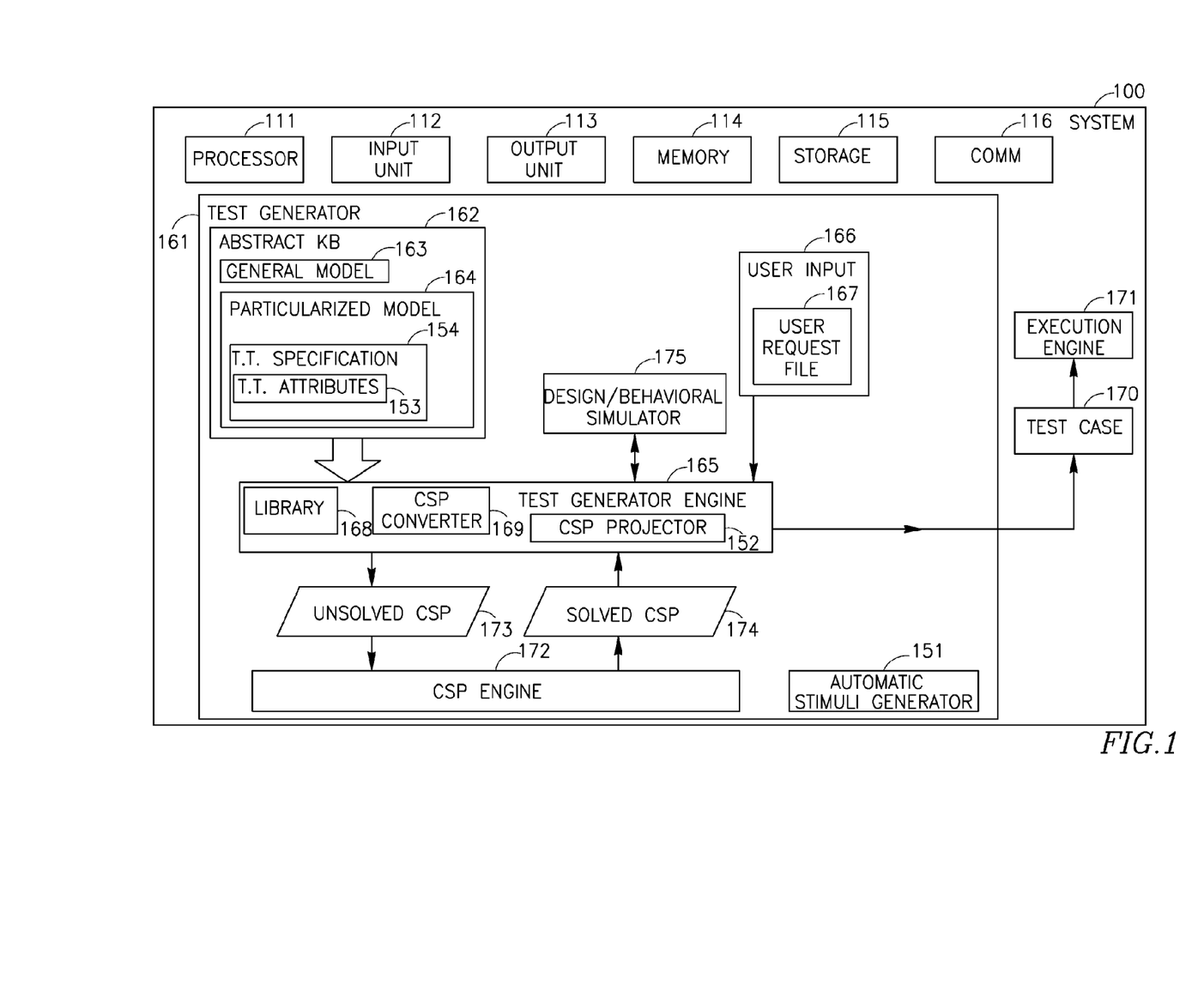
FIG. 1 is a schematic block diagram illustration of a design verification system in accordance with a demonstrative embodiment of the invention.

FIG. 1 schematically illustrates a block diagram of a design verification system 100 in accordance with some demonstrative embodiments of the invention. System 100 may optionally be implemented or may operate, for example, using a computing device, a computer, a personal computer (PC), a server computer, a client/server system, a mobile computer, a portable computer, a laptop computer, a notebook computer, a tablet computer, or the like.

System 100 may include, for example, a processor 111, an input unit 112, an output unit 113, a memory unit 114, a storage unit 115, and a communication unit 116. System 100 may optionally include other suitable hardware components and/or software components.

Processor 111 may include, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Processor 111 may, for example, execute instructions, execute one or more software applications, and process signals and/or data transmitted and/or received by system 100.

Input unit 112 may include, for example, a keyboard, a keypad, a mouse, a touch-pad, a stylus, a microphone, or other suitable pointing device or input device. Output unit 113 may include, for example, a cathode ray tube (CRT) monitor or display unit, a liquid crystal display (LCD) monitor or display unit, a screen, a monitor, a speaker, or other suitable display unit or output device.

Memory unit 114 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 may include, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

Communication unit 116 may include, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a micro-strip antenna, a diversity antenna, or the like.

In some embodiments, the components of system 100 may be enclosed in, for example, a common housing, packaging, or the like, and may be interconnected or operably associated using one or more wired or wireless links. In other embodiments, for example, components of system 100 may be distributed among multiple or separate devices, may be implemented using a client/server configuration or system, may communicate using remote access methods, or the like.

System 100 may be adapted to perform simulation-based functional verification of a hardware design ("design-under-test") that may include an address translation mechanism. The design-under-test may describe one or more hardware modules that include an address translation mechanism, for example, a processor, a controller, a CPU, a DSP, a bus-bridge, a circuit, an IC, a DMA controller, or the like.

Accordingly, system 100 may include one or more hardware components and/or software components able to perform one or more operations of the functional verification process. For example, in some embodiments, system 100 may include a test generator 161 adapted to generate random or pseudo-random values used in the verification process. System 100 may further include an abstract knowledge base 162 adapted to store a formal description of the specification of the design-under test, optionally including, for example, testing knowledge, testing constraints, testing coverage criteria, and/or other information. In some embodiments, the abstract knowledge base 162 may include, for example, a general model 163 of the design-under test, optionally including testing knowledge that may be helpful in providing test coverage and/or biasing the testing process towards "interesting" cases. The abstract knowledge base 162 may further include a particularized model 164 of the address translation mechanism under test, for example, a model that describes the address translation mechanism of the design-under-test. For example, the particularized model 164 may include a translation table specification 154, which may include translation table attributes 153. In some embodiments, the general model 163 may include the particularized model 164; in other embodiments, the general model 163 and the particularized model 164 may be related, linked, combined, or substantially separate.

The test generator 161 may include, for example, a test generator engine 165, optionally adapted to receive a user input 166, e.g., a user request file 167. For example, the user input 166 may be utilized by the algorithm that generates test cases. In some embodiments, the test generator engine 165 may optionally be associated with a design simulator 175.

The test generator engine 165 may include an auxiliary address translation library 168 and a CSP converter 169. The CSP converter 169 may convert the particularized model 164 of the address translation mechanism into a CSP, utilizing the auxiliary address translation library 168. In some embodiments, the auxiliary address translation library 168 may be or may include or may be associated with a CSP converter able to handle address translation aspects of the verification system. The test generator engine 165 may further include a CSP projector 152 in accordance with some embodiments of the invention, operably associated with CSP converter 169.

In some embodiments, the CSP may be associated with a set of variables. Substantially each variable may be associated with a finite and discrete domain, and with a set of constraints. Substantially each constraint may be defined over a subset of the original set of variables, thereby limiting the combinations of values that the variables in that subset may take. In some embodiments, the goal of the CSP solving process may be to find an assignment to the set of variables, such that the assignment satisfies all the constraints. In some embodiments, the goal of the CSP solving process may be to find a random assignment. In some embodiments, the goal of the CSP solving process may be to find substantially all such assignments.

In some embodiments, a CSP may be defined as triple $\langle X, D, C \rangle$, where X is a set of variables, D is a domain of values, and C is a set of constraints. Each constraint is in turn a pair $\langle t, R \rangle$, where t is a tuple of variables and R is a set of tuples of values; all these tuples having the same number of elements; as a result R is a relation. An evaluation of the variables is a function from variables to $u: X \rightarrow D$. Such an evaluation satisfies a constraint $\langle (x_1, \ldots, x_n), R \rangle$ if $(u(x_1), \ldots, u(x_n)) \in R$. A solution is an evaluation that satisfies all constraints.

In some embodiments, iterative generation may be used such that a CSP is substantially separately generated (by test generator engine 165) and solved (by a CSP engine 172) for discreet instructions in an instruction stream; each instruction is simulated or executed (e.g., in hardware, or by a design simulator) as a stand-alone instruction; a test case 170 (e.g., a composite test case) is constructed based on the results of the individual simulations or executions of the instructions; and the composite test case 170 is executed by an execution engine 171. In other embodiments, comprehensive generation may be used such that a single global CSP is generated (by test generator engine 165) corresponding to a set of instructions (or, to substantially all relevant instructions) of the instruction stream, and the global CSP is then solved (by the CSP engine 172); a test case 170 is generated from the solution of the CSP; and the test case 170 is then executed by the execution engine 171. The CSP engine 172 may receive an unsolved CSP 173 and may produce a solved CSP 174.

The test case 170 may be executed by the execution engine 171 on an implementation of the design-under-test. For example, the execution engine 171 may include a simulator of the design-under-test, or a hardware realization of the design-under-test.

In accordance with some embodiments of the invention, system 100 may include an automatic stimuli generator 151 adapted to generate stimuli, for example, corresponding to random or pseudo-random simulation environments. The generated stimuli may be, for example, in the form of test cases designed to trigger architecture events and/or micro-architecture events defined by a verification plan. In some embodiments, the automatic stimuli generator 151 may optionally be implemented using a software module or components. The automatic stimuli generator 151 may receive as input a specification for a required test (for example, a test template), and may generate as output multiple random or pseudo-random stimuli that comply with the specification. In accordance with some embodiments, the automatic stimuli generator 151 may generate stimuli which are "valid", for example, conforms to architectural rules associated with a design, as well as "interesting" (namely, stimuli of interest), for example, testing selected aspects of the design under verification. The automatic stimuli generator 151 may optionally allow user control over the generated stimuli. Accordingly, multiple constraints may be associated with the generated stimuli, and the automatic stimuli generator 151 may thus utilize a modeling and generation scheme that includes CSPs and CSP-solving mechanism.

Although the automatic stimuli generator 151 and the test generator 161 are shown in FIG. 1 as separate components, embodiments of the invention are not limited in this regard. For example, in some embodiments, test generator 161 may be a particular type or a particular implementation of automatic stimuli generator 151, or vice versa. In some embodiments, operations or functions discussed herein with reference to the test generator 151, may be operations or functions of the automatic stimuli generator 151, or vice versa. In some embodiments, for example, automatic stimuli generator 151 may generate signals, e.g., direct values generated to correspond to the signals of the design-under-test. In some embodiments, test generator 161 may be a demonstrative type of automatic stimuli generator 151. In some embodiments, test generator 161 may optionally include another stimuli generator (for example, able to generate stimuli for address translation) and its output may be used for test generation.

In some embodiments, automatic stimuli generator 151 may be used for functional verification of a design-under-test. Some stimuli may be generated for functional verification of address translation mechanism of the design-under-test. In some embodiments, the automatic stimuli generator 151 may generate test cases, namely, the automatic stimuli generator 151 may be implemented as (or may include) test generator 161. The test generator 161 may utilize a CSP-based approach to generate stimuli. The CSPs may be solved by the CSP engine 172, optionally utilizing an arc-consistency algorithm, for example, maintaining arc consistency (MAC). The arc-consistency algorithm may utilize a projector, for example, to synchronize the domains of the CSP variables. In particular, a projector may be used to synchronize the domains of CSP variables related to address translation. The projector may synchronize between the domains of multiple translation table attributes. In some embodiments, the projector may synchronize between the domains of substantially all the translation table attributes. The attributes may include, for example, input and output addresses of the translation tables, availability of translation of an input address, the location and contents of entry used to translate the input address (if translation is available), and the size of the translated region.

System 100 may be used to perform functional verification of a hardware design including an address translation mechanism. In some embodiments, the address translation mechanism may be designed to perform multiple, subsequent, address transformations to calculate a particular location in a memory component, optionally utilizing one or more translation tables. A translation table may include multiple translation entries, and an entry may include information sufficient to translate a subset of addresses of an input address domain into a subset of addresses of an output address domain.

In some embodiments, the translation table may specify one or more rules, for example: a rule that determines which entries may participate in the transformation process; a rule that determines whether a given entry may be used to transform a given input address (namely, a match condition); a rule that determines how to transform a given input address to a corresponding output address based on the matching entry (namely, a transformation rule); and/or other suitable rules. In some embodiments, for a given address (for example, in one embodiment, for substantially any given address), a translation table may require that at most one entry may be used to translate the given address; and the translation table may report a failure if no such entry exists. In some embodiments, optionally, translation tables may be located in a memory component, or in one or more registers associated with a common register family.

In accordance with some embodiments, the stimuli utilized in the functional verification of a translation table may include, for example, the contents of the table entries and a set of input addresses. In order to selectively trigger one or more design aspects or design features under verification, the automatic stimuli generator 151 may allow a user to control one or more attributes associated with table translations, for example, input addresses, output addresses, location of the table entry used for the translation, and/or other attributes. For example, in some embodiments, a particular table entry location may be utilized repeatedly (for example, based on a user's command) in the translation of multiple addresses in order to test the performance of a translation cache mechanism.

In some embodiments, the automatic stimuli generator 151 may generate stimuli for functional verification of address translation mechanisms or translation-table-based address translation mechanisms in accordance with architectural restrictions and/or user requirements for one or more attributes. In some embodiments, the automatic stimuli generator 151 may, for example, automatically create a CSP projector 152 over translation table attributes 153 based on a specification 154 of the translation table.

In some embodiments, the automatic stimuli generator 151 may use one or more CSPs to represent the restrictions on the stimuli. In some embodiments, an arc-consistency based solver may be used (e.g., by the auxiliary address translation library 168 and the CSP engine 172) to solve the CSP. In such cases, for example, the test generator 161 may create one or more CSP projectors 152 over the translation table attributions 154.

In accordance with some embodiments of the invention, a constraint is arc-consistent if for every value in the domain of one variable there are values in the domain of the other variables such that they satisfy the constraint. The CSP projector 152 may be or may include, for example, a code, a process, a module, an algorithm, a unit, a hardware component, a software component, or a combination thereof, which may make a specific constraint arc-consistent.

The CSP projector 152 generated and operative in accordance with some embodiments of the invention may include, for example, a projector adapted to filter-in and/or filter-out one or more translation table attributes, a projector adapted to perform one or more unary operations or other operations over a set of translation table attributes, a projector adapted to generate a subset of information items narrowed down or selectively filtered from a set of information items, a projector adapted to utilize other relational operations to selectively generate a subset of data items from a larger set of data items, or the like.

In some embodiments, the CSP converter 169 may receive as input, for example: a set of CSP variables representing one or more translation attributes or translation table attributes 153, or representing substantially all the translation table attributes; the format of a translation entry, or the locations of substantially all fields in the entry; a projector implementing a match rule; a projector implementing a translation rule; a projector between the location of an entry (namely, entry_location) and a content of the entry (namely, entry_content), wherein the projector may be updated if a new entry location receives a content; and/or other data items. In some embodiments, the match rule and/or the translation rule may be specified as Boolean logic in the architecture specification, and projectors may be created for such Boolean logic formulas. In some embodiments, the projector between entry_location and entry_content may require projection over an indexed array. In some embodiments, optionally, a projection algorithm may be utilized to allow, for example, simultaneous or substantially simultaneous control of table fields and input-output addresses.

In some embodiments, for example, the specification of the translation table may necessarily include at least the following information: format of the table entry, namely, the location of each field in the entry; projector implementing the match rule; projector implementing the translation rule; and projector between the location of the translation table entry and its contents.

In some embodiments, the CSP converter 169 may generate as output for example, a CSP projector 152 over the CSP variables representing the translation table attributes 153 that restrict the attributes to "legal" values or "valid" values.

In some embodiments, the CSP projector 152 may operate or may be implemented in accordance with a pre-defined code or pseudo-code. A set of data items denoted DataParams may be received as input, or may be otherwise utilized, and may include, for example: an input address; an output address; locations of one or more translation table entries that are permitted to participate in the translation process; location of a translation table entry used to translate the input address, if applicable (denoted entryAddress); content of the translation table entry used to translate the input address, if applicable (denoted entryData); a parameter indicating selection of "hit" or "miss" (denoted isMatch); a parameter indicating partition size; and/or other parameters.

In some embodiments, for example, a CSP projection algorithm or a CSP projector may be implemented using a code which may be similar to the following demonstrative pseudo-code:

---

Code 1

1. Let SavedParams be set of empty domains for all variables as specified in DataParams
2. Let PotentiallySavedParams be set of empty domains for all variables as specified in DataParams
3. Copy DataParams into the temporary set of variables CopyParams.
   Steps 4 through 12 are performed on the CopyParams.
4. Synchronize entry fields with entry data. Remove all the values from the variables that represent fields of the entry that do not match the corresponding fragments in the values of the entry data, and remove all the values of the entry data that are not consistent with the values of the entry fields.
5. If isMatch variable is true or universal
      6. Run projector implementing match rule (MatchConstraint)
         7. if isMatch is universal
            8. Copy CopyParams into TempParams
            9. Run projector implementing the translation rule (TransformationConstraint) on TempParams
            10. If Transformation Constraint failed
               11. isMatch <- false (in CopyParams)
      12. If isMatch is true
         13. Run TransformationConstraint on CopyParams
         14. If domains of any of the parameters were changed go to step 5
15. Run CheckAllSets(copyParams, SavedParams, PotentiallySavedParams, isApproximatedMatchFound)
    This routine is described herein (Code 2) and returns failure if the run fails
16. If isApproximatedMatchFound is true go to step 5.
17. Synchronize entry fields with entry data, as described in step 4
18. if isMatch is true and entryData and entryIndex are singleton
       19. Update the projector between entry location and entry content to express this new information
20. Copy CopyParams to DataParams In some embodiments, the CheckAllSets routine of step 15 in Code 1 may check substantially all the entries in substantially all the sets of entries that are permitted to participate in the translation process. The CheckAllSets routine may reduce the number of CopyParams variables, for example, to prevent double matches or multiple matches, and to comply with one or more constraints, for example, to comply with MatchConstraint and TransformationConstraint. The CheckAllSets routine may be implemented, for example, using a code which may be similar to the following demonstrative pseudo-code:

---

Code 2

```
CheckAllSets    (Input/Output Parameters: CopyParams, SavedParams, PotentiallySavedParams
                Output Parameters: isApproximatedMatchFound)
    1. Synchronize table fields with entry data, as described in step 4 of the projection algorithm.
    2. Let hasEveryAddressExactMatch be true
    3. Let hasAnyAddressEntryForMatch be false
    4. Let isApproximatedMatchFound be false
    5. For each set of entries permitted to participate in the translation process do:
         6. Mark the all the entries in set as 'good'
         7. Let hasAddressEntryForMatch be false
         8. Let hasAddressExactMatch be false
         9. Run CheckEntries (set of entries permitted to participate,
            hasEveryAddressExactMatch, hasAddressExactMatch, CopyParams, SavedParams,
            PotentiallySavedParams, hasAddressEntryForMatch, hasAddressExactMatch,
            isApproximatedMatchFound, matchingEntry)
            This routine is described herein (Code 3)
            10. If CheckEntries fails mark all the entries in the set as 'bad' and continue with the
                next set
            11. If isMatch is true and hasAddressEntryForMatch is false, mark the all the entries in set
                as 'bad' and continue with the next set
            12. If isMatch is true
                13. If hasAddressExactMatch is false
                    14. if PotentiallySavedParams set is equal to CopyParams set
                        15. hasAddressExactMatch <- true
                        16. SavedParams <- Union (PotentiallySavedParams, SavedParams)
                17. If hasAddressExactMatch is true then mark the matchingEntry as 'good', and
                    all other entries as 'bad'
            18. hasEveryAddressExactMatch <- hasEveryAddressExactMatch and
                hasAddressExactMatch
            19. hasAnyAddressEntryForMatch <- hasAnyAddressEntryForMatch or
                hasAddressEntryForMatch
    20. Remove all the sets of entries permitted to participate in the translation process that have
        only entries marked as 'bad'.
    21. If no sets of entries permitted to participate remain, return failure
    22. If isMatch is true
        23. Remove all the entries marked as 'bad' from the sets of entries permitted to participate
        24. Remove all empty sets of entries permitted to participate
        25. If no sets of entries permitted to participate remain, return failure
    26. if hasEveryAddressExactMatch is true
        27. CopyParams <- Intersect (CopyParams, SavedParams)
        28. if isMatch is universal
            29. isMatch <- true
    30. if hasAnyAddressEntryForMatch is false
        31. If isMatch is universal
            32. isMatch <- false
```

In some embodiments, the CheckEntries routine of step 9 in Code 2 may check substantially all the entries for a given set of entries that are permitted to participate in the translation process. The CheckEntries routine may be implemented, for example, using a code which may be similar to the following demonstrative pseudo-code:

---

Code 3

---

```
CheckEntries (Input Parameters: set of entries permitted to participate,
                               hasEveryAddressExactMatch,
              Input/Output Parameters: hasAddressExactMatch, CopyParams,
                               SavedParams, PotentiallySavedParams,
                               hasAddressEntryForMatch
              Output Parameters: hasAddressExactMatch, isApproximatedMatchFound,
                               matchingEntry)
  1. Let hasAddressEntryForMatch be false
  2. For each entry in the set of entries permitted to participate,
       3. If entry is not initialized
            4. hasAddressEntryForMatch <- true
            5. continue to the next entry
       6. Let isExactMatchFound be false
       7. Let isEntryForMatchFound be false
       8. Copy CopyParams to temporary set tempParams
       9. Get entry content from the corresponding entry using projector between entry
          location and entry content, and update the values of the entry fields in the
          tempParams
      10. Run MatchConstraint
      11. If MatchConstraint failed
            12. if isMatch was true mark the entry as 'bad' index and continue to the next
                entry
            13. if isMatch was false return failure
      14. If there exists exact match (MatchConstraint reduced isMatch parameter to true
          or isMatch was true and MatchConstraint did not reduce any other parameter)
            15. If entry contents does not fit the values of the entry fields in the CopyParams,
                return failure
            16. Else isExactMatchFound <- true
      17. if isMatch is true and isExactMatchFound is false and entry contents does not fit
          the values of the entry fields in the CopyParams
      18. Remove input addresses that remained in the tempParams from copyParams
      19. isApproximatedMatchFound <- true
      20. Mark entry as 'bad' and continue to the next entry
  21. If isMatch is false continue to the next entry
  22. If isMatch is universal and the entry does not fit the values of the entry Fields in
      the CopyParams continue to the next entry
  23. Run TransformationConstraint
  24. If TransformationConstraint failed
        25. If isExactMatchFound is true return failure
        26. Else if isMatch is true
              27. Remove input addresses that remained in the tempParams from
                  copyParams
              28. isApproximatedMatchFound <- true
              29. Mark entry as 'bad' and continue
        30. Else continue to the next entry
  31. If entry fits the values of the entry fields in the CopyParams
        32. isEntryForMatchFound <- true
  33. If isExactMatchFound and hasAddressExactMatch are true return failure
  34. If hasEveryAddressExactMatch is true
        35. If isExactMatchFound is true
              36. Join tempParams to SavedParams
        37. Else if hasAddressExactMatch is false and isEntryForMatchFound is true
              38. Join tempParams to PotentiallySavedParams
  39. if isExactMatchFound is true remember matchingEntry <- current entry
  40. hasAddressExactMatch <- hasAddressExactMatch or isExactMatchFound
  41. hasAddressEntryForMatch <- hasAddressEntryForMatch or
      isEntryForMatchFound
```

---

In some embodiments, system 100 may be adapted to automatically generate a CSP projector 152 over translation table attributes 153, for example, over substantially all the translation table attributes 153 that possibly participate in the address translation process, based on a specification 154 of the address translation table or the address translation mechanism. For example, system 100 may automatically generate a CSP projector 152 between variables that represent input and output addresses of the translation table(s), availability of translation of an input address, the location and contents of entry used to translate the input address (if translation is available), and the size of the translated region. In some embodiments, for example, system 100 may extract the above-mentioned information from the description of the translation table, and may apply one or more of the algorithms described above.

In some embodiments, system 100 may utilize a single projector or multiple projectors. In some embodiments, optionally, a projector may be used between the translated address and the location of the table entries that are permitted to be used for address translation. In some embodiments, this projector may be utilized substantially unmodified and/or substantially without including this projector as an internal part of the CSP projection algorithm (e.g., to allow improved performance). In accordance some embodiments, the utilization of multiple projectors (e.g., two projectors) may not reduce the accuracy or quality of the resulting projection.

In some embodiments, system 100 may be used to generate various types of verification scenarios for address translation tables, for example, matching an existing entry and/or adding new entries, and/or generating exceptions or failures. The system 100 may be used for address translation tables in which a match function is not required or is not utilized, and/or other types of address translation tables.

In some embodiments, for example, system 100 may be able to automatically generate CSP projectors that projects on entry_data before entry_address is known (e.g., singleton), CSP projectors that refrain from projecting on entry_data before the set of entry_address is known (e.g., singleton), and/or other CSP projectors. In some embodiments, transformation constraint(s) may be integrated in the projection process and may be utilized in the projection process, for example, thereby allowing an early and rapid elimination of entries that cannot be used for address translation.

Figure 2A:
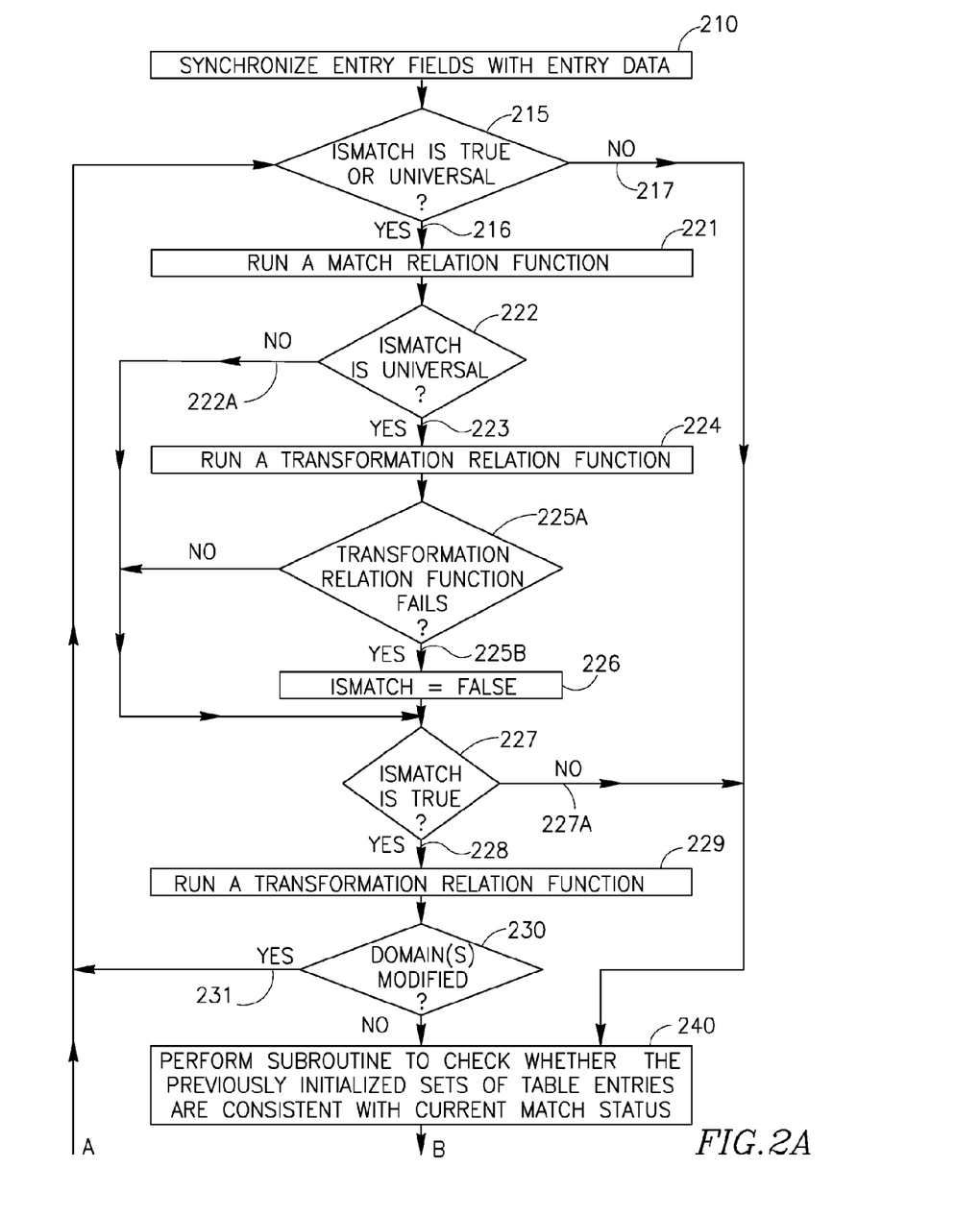
FIGS. 2A and 2B are schematic flow-charts of a method of constraint-satisfaction-problem projection in accordance with a demonstrative embodiment of the invention.
Figure 2B:
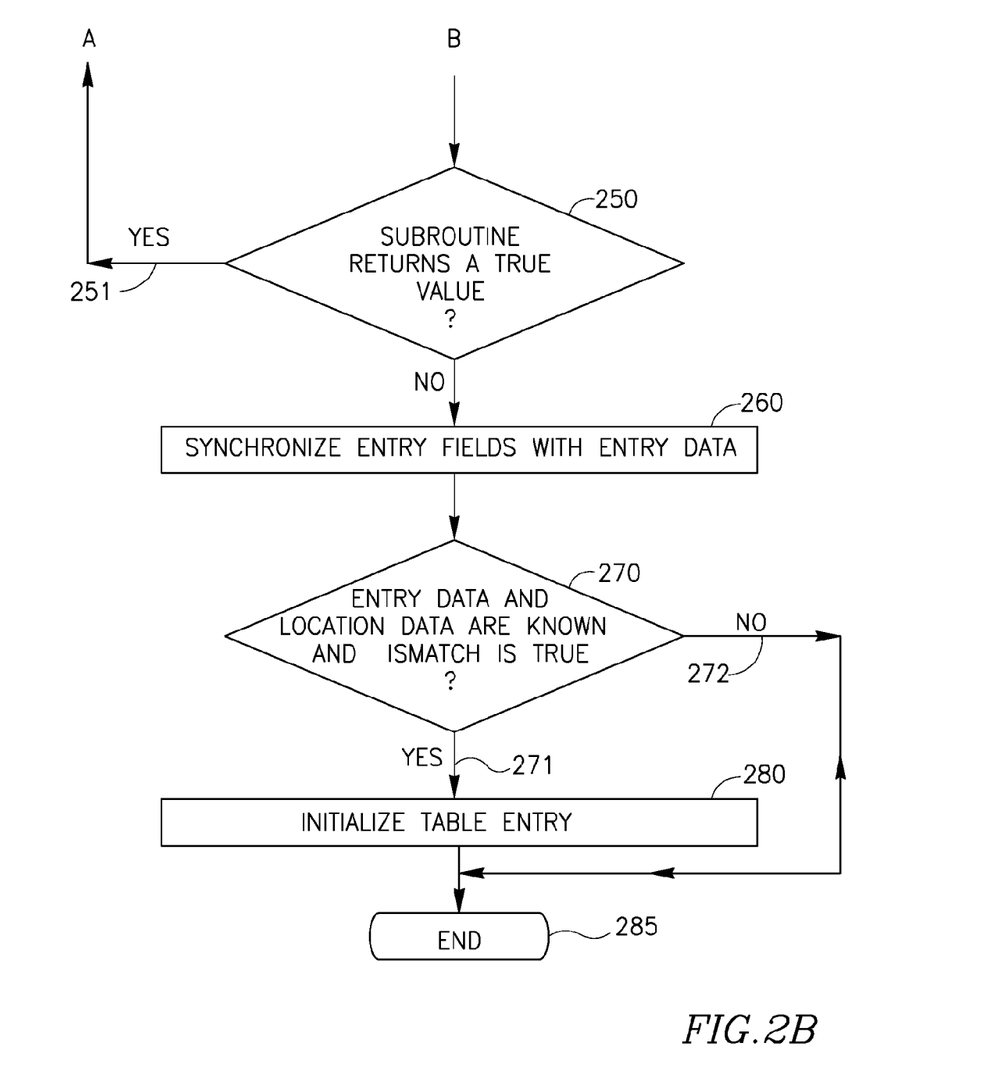

FIGS. 2A and 2B are schematic flow-charts of a method of CSP projection in accordance with some embodiments of the invention. Operations of the method may be implemented, for example, by system 100 of FIG. 1, and/or by other suitable units, devices, and/or systems. In some embodiments, the method of FIGS. 2A and 2B may be used, for example, for automatic creation of a CSP projector over translation table attributes in view of a pre-provided specification of an address translation table. In some embodiments, for example, the algorithm of Code 1 above may be a demonstrative implementation of the method of FIGS. 2A and 2B.

In some embodiments, the method may optionally include, for example, synchronizing entry fields with entry data (block 210). This may include, for example, removing substantially all the inconsistent values of variables that are permitted to participate in address translation. In some embodiments, for example, the method may include removing substantially all the values from variables that represent fields of the entry that are inconsistent with the corresponding fragments in the values of the entry data, and/or removing substantially all the values of the entry data that are inconsistent corresponding values of the entry fields.

In some embodiments, as described herein, the method may optionally include attempting to create a match, for example, a determination that a particular entry of the address translation table (or a content thereof) is able to successfully translate a particular address. For example, in some embodiments, if a match is created, then a value of a parameter denoted isMatch is non-false.

In some embodiments, the method may optionally include, for example, checking whether the value of isMatch is true or universal (block 215). If the checking result is affirmative (arrow 216), then the method may include performing one or more of the operations indicated in blocks 221-229. In contrast, if the checking result is negative (arrow 217), then the method may include performing the operations indicated in block 240 and onward.

Referring now to the to blocks 221-230, the method may optionally include, for example, running a match relation function (block 221), e.g., running a projector implementing a match rule.

In some embodiments, the method may optionally include, for example, checking whether the isMatch parameter is universal (block 222). If the checking result is negative (arrow 222A), then the method may proceed to perform the operations of block 227 and onward. In contrast, if the checking result is affirmative (arrow 223), then the method may include, for example, running a transformation relation function (block 224), e.g., running a projector implementing a translation rule. If the transformation relation function fails (block 225A and arrow 225B), then the method may include assigning a false value to the isMatch parameter (block 226).

In some embodiments, the method may optionally include, for example, checking whether the isMatch parameter is true (block 227). If the checking result is negative (arrow 227A), then the method may proceed to perform the operations of block 240 and onward. In contrast, if the checking result is affirmative (arrow 228), then the method may include, for example, running a transformation relation function (block 229), e.g., running a projector implementing a translation rule. If one or more domains is modified by the transformation relation function (for example, if the transformation relation function reduced one or more domains), then the method may proceed to perform the operations of block 215 and onward (block 230 and arrow 231).

Referring now to blocks 240 and onward, the method may optionally include, for example, performing a subroutine (block 240) to check whether the previously initialized sets of table entries are consistent with (e.g., support) the current match status. The subroutine may optionally include, for example, removing bad or inconsistent values from the sets under check. In some embodiments, for example, the subroutine may optionally include one or more of the operations of the method of FIGS. 3A and 3B.

In some embodiments, if the subroutine returns a true value (block 250 and arrow 251), then the method may optionally include performing the operations of block 215 and onward.

As indicated at block 260, the method may optionally include synchronizing entry fields with entry data. This may include, for example, removing substantially all the inconsistent values of variables that are permitted to participate in address translation. In some embodiments, for example, the method may include removing substantially all the values from variables that represent fields of the entry that are inconsistent with the corresponding fragments in the values of the entry data, and/or removing substantially all the values of the entry data that are inconsistent corresponding values of the entry fields.

In some embodiments, the method may include, checking whether entry data and location data are known, and whether the value of the isMatch parameter is true (block 270). If the checking result is negative (arrow 272), then the method may not initialize the table entry, and may end (block 285). In contrast, if the checking result is affirmative (arrow 271), then the method may include, for example, initializing the table entry (block 280). In some embodiments, for example, the projector between entry location and entry content may be updated, for example, to reflect that entry data and location data are known and that the value of the isMatch parameter is true.

Other suitable operations or sets of operations may be used in accordance with embodiments of the invention.

Figure 3A:
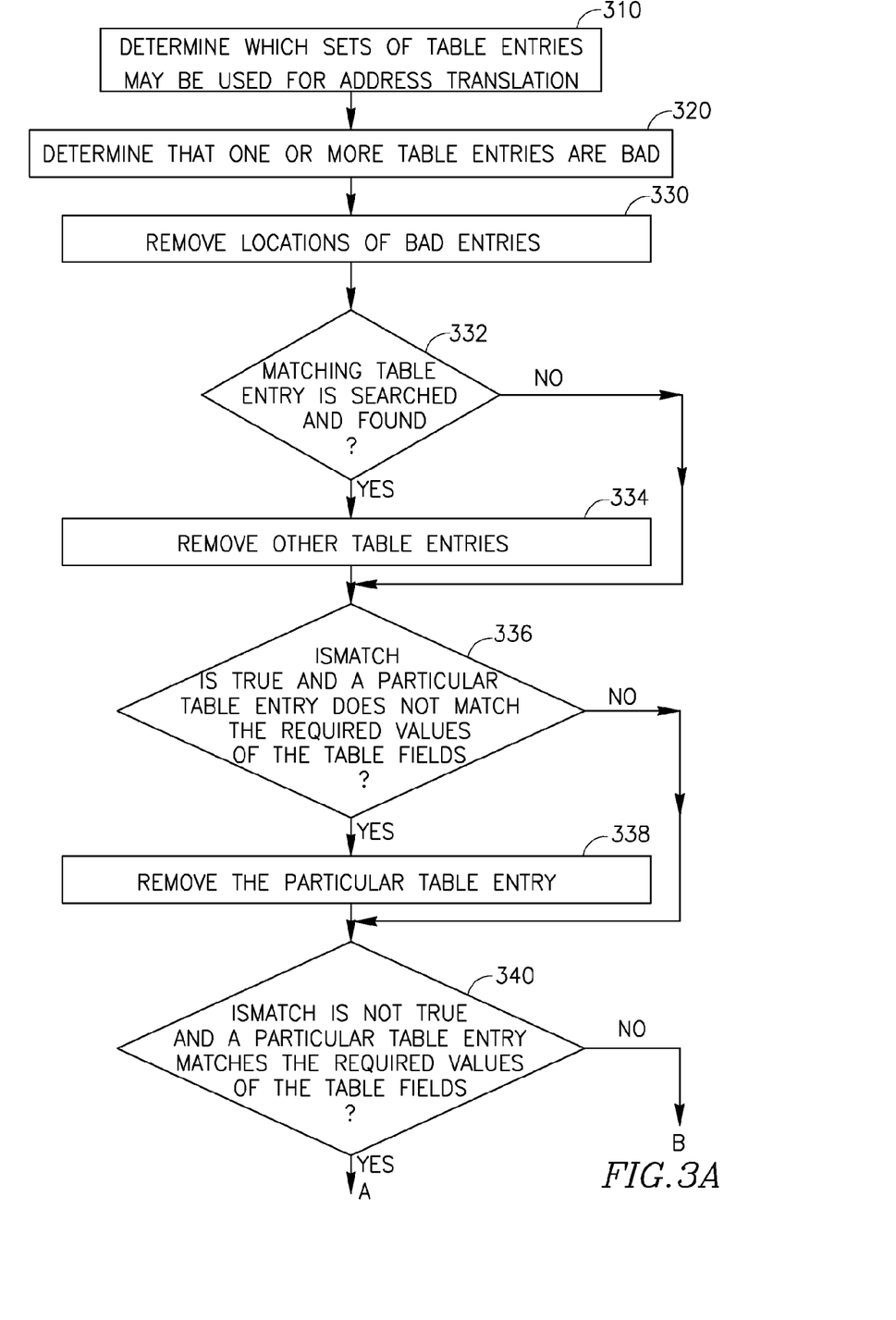
FIGS. 3A and 3B are schematic flow-charts of a method of checking previously-initialized translation table entries in accordance with a demonstrative embodiment of the invention.
Figure 3B:
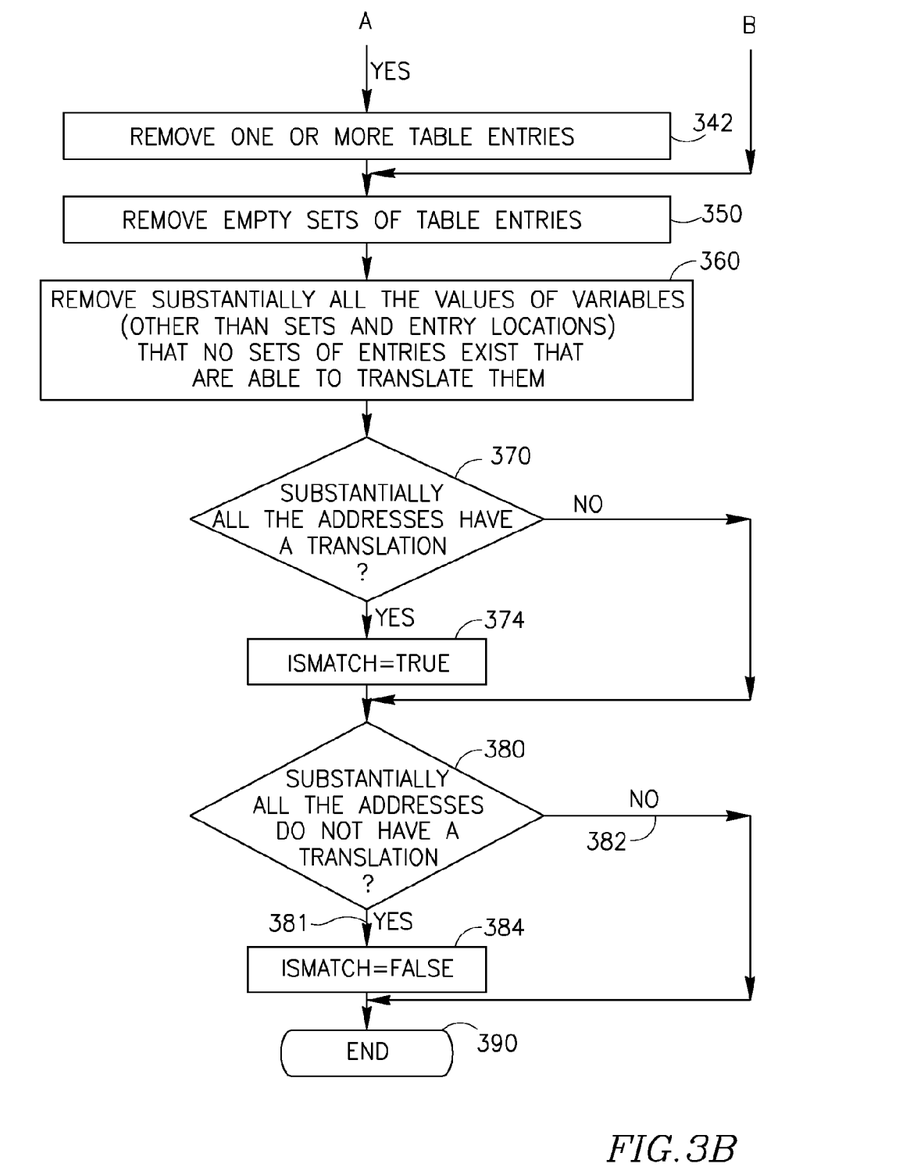

FIGS. 3A and 3B are schematic flow-charts of a method of checking previously-initialized translation table entries in accordance with some embodiments of the invention. Operations of the method may be implemented, for example, by system 100 of FIG. 1, and/or by other suitable units, devices, and/or systems. In some embodiments, for example, the algorithms of Code 2 and Code 3 above may be a demonstrative implementation of the method of FIGS. 3A and 3B. In some embodiments, for example, the subroutine of block 240 of FIG. 2A may be implemented using the method of FIGS. 3A and 3B.

In some embodiments, the method may optionally include, for example, determining which sets of table entries may be used (e.g., are permitted to be used) for address translation (block 310).

In some embodiments, the method may optionally include, for example, determining that one or more table entries are "bad" (e.g., their content is illegal, invalid, inconsistent with one or more constraints or table attributes, or the like) (block 320), and removing locations of bad entries (block 330). For example, if a matching table entry is searched and found (block 332), then other table entries may be removed (block 334). In some embodiments, if the isMatch parameter is true, and a particular table entry does not match the required values of the table fields (block 336), then the particular table entry may be removed (block 338). In some embodiments, if the isMatch parameter is not true, and a particular table entry matches the required values of the table fields (e.g., the particular table entry is able to translate a given address) (block 340), then one or more table entries may be selectively removed (block 342), for example, substantially all the entry set may be removed.

In some embodiments, the method may optionally include, for example, removing one or more empty sets of table entries, e.g., removing substantially all the empty sets of table entries (block 350).

In some embodiments, the method may optionally include, for example, removing substantially all the values of variables (other than entry sets and entry locations) that no sets of entries exist that are able to translate them (block 360).

In some embodiments, the operations that precede block 360 may, for example, remove entry sets and entry locations; whereas the operation of block 360 may remove the values of other attributes (other than entry sets and entry locations) that do not have an entry location available for them any longer (for example, due to removal in prior operations).

In some embodiments, the method may optionally include, for example, checking whether substantially all the addresses have a translation (block 370). If the checking result is affirmative, then the method may include setting the isMatch parameter to be true (block 374).

In some embodiments, the method may optionally include, for example, checking whether substantially all the addresses do not have a translation (block 380). If the checking result is affirmative (arrow 381), then the method may include setting the isMatch parameter to be false (block 384). In contrast, if the checking result is negative (arrow 382), then the method may not reduce the isMatch parameter and may end (block 390).

Other suitable operations or sets of operations may be used in accordance with embodiments of the invention.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of testing an address translation mechanism, comprising:

receiving, by a test generator implemented by a processor, a specification of at least one address translation table, including information indicating a format of a translation table entry, a projector implementing a match rule and a projector implementing a translation rule;

receiving, by the test generator, a user input including a user requirement on at least one attribute from a group including:

whether the test should result in a match,
an output address of the test,
a table entry used by the test,
a size of a translation region used by the test, and
a content of the table entry used in the test;

providing previously generated table entries resulting from previously generated test cases;

generating a constraint-satisfaction-problem for the at least one address translation table, the user requirement and the previously generated table entries;

repeatedly applying a plurality of different projectors to the constraint-satisfaction-problem in alternation, so as to reduce the number of possible solutions of the constraint-satisfaction-problem, until the projectors do not change the extent of possible solutions of the constraint-satisfaction-problem; and selecting a solution for the constraint-satisfaction-problem from the possible solutions remaining after the applying of the plurality of different projectors projector so as to generate a test case for testing the address translation mechanism.

2. The method of claim 1, wherein repeatedly applying a plurality of different projectors, comprises:
setting a match parameter indicating whether a translation table entry is intended to correctly translate an input address;
synchronizing possible entry fields of said address translation table with possible entry data of said address translation table;
if the synchronization succeeds and the match parameter is not false, running a match relation function;
if, after running said match relation function, said match parameter is not false, running a transformation relation function; and
if the possible values of attributes of the address translation table are not modified by said transformation relation function, determining whether the previously-generated translation table entries are consistent with a current match status.

3. The method of claim 2, wherein determining whether the previously-generated translation table entries are consistent with a current match status comprises:
determining which translation table entry values are usable for address translation in accordance with the previously generated table entries;
determining that one or more translation table entry values are inconsistent with one or more constraints associated with said previously generated table entries; and
removing said one or more inconsistent translation table entry values.

4. The method of claim 3, further comprising:
removing substantially all values of attributes that no possible translation table entry values exist that are able to translate them.

5. The method of claim 4, further comprising:
if substantially all addresses have a translation, setting said match parameter to be true.

6. The method of claim 4, further comprising:
if substantially all addresses do not have a translation, setting said match parameter to be false.

7. The method of claim 1, wherein the received user input which the generated projector is required to meet comprises an indication on whether the test should result in a match.

8. The method of claim 1, wherein the received user input which the generated projector is required to meet comprises a table entry used by the test.

9. The method of claim 1, wherein the received user input which the generated projector is required to meet comprises an output address of the test.

10. The method of claim 1, wherein the received user input which the generated projector is required to meet comprises a size of a translation region used by the test.

11. The method of claim 1, wherein the received user input which the generated projector is required to meet comprises a content of the table entry used in the test.

12. The method of claim 1, wherein generating the constraint-satisfaction-problem comprises determining domains of possible values for each of the attributes:
input address;
output address;
whether the test should result in a match;
table entry address; and
content of table entry, and
removing from the domains of each attribute, values which cannot be used with the domain values of other attributes.

13. The method of claim 12, wherein repeatedly applying the plurality of different projectors does not remove suitable solutions of the constraint-satisfaction-problem before selecting the solution, such that all the possible attribute values which are consistent with each other, with the user requirement on the at least one of the attributes, and with the previously generated table entries, are available when selecting the solution for generating the test case.

14. The method of claim 12, comprising identifying situations in which the user requirements and the previously generated table entries exclude generation of a test which results in a matching entry.

15. The method of claim 1, comprising repeating the receiving of a specification, the receiving of a user input, the generating of a constraint-satisfaction-problem and the repeatedly applying a plurality of different projectors by the test generator, for a different translation table specification.

16. The method of claim 1, wherein repeatedly applying a plurality of different projectors comprises repeatedly applying the projector implementing a match rule and the projector implementing a translation rule.

17. The method of claim 1, wherein repeatedly applying a plurality of different projectors comprises applying at least one projector to a copy of data from the constraint-satisfaction-problem to determine whether the constraint satisfaction problem has a solution which involves a match.

18. The method of claim 1, wherein repeatedly applying a plurality of different projectors comprises applying a projector which removes solutions not consistent with previously generated table entries.

19. An apparatus for testing an address translation mechanism, comprising:
an input unit for receiving a specification of at least one address translation table, including match rules and translation rules;
a user input for receiving a user requirement on at least one of the attributes: whether the test should result in a match, an output address of the test, a table entry used by the test and a content of the table entry used in the test;
a storage unit managing previously generated table entries; and
a processor configured to generate a constraint-satisfaction-problem projector for the specification of the at least one address translation table, the user requirement on the at least one of the attributes and the previously generated table entries, and to repeatedly apply a plurality of different projectors to the constraint-satisfaction-problem in alternation, so as to reduce the number of possible solutions of the constraint-satisfaction-problem, until the projectors do not change the extent of possible solutions of the constraint-satisfaction-problem and to select a solution for the constraint-satisfaction-problem from the possible solutions remaining after the applying of the plurality of different projectors so as to generate a test case for testing the address translation mechanism.

20. The apparatus of claim 19, wherein the test generator is to generate a first constraint-satisfaction-problem projector to project over attributes of a first address translation table specification, and to generate a second, different, constraint-satisfaction-problem projector to project over attributes of a second, different, address translation table specification.

* * * * *